US012486147B2

(12) United States Patent
Princess et al.

(10) Patent No.: US 12,486,147 B2
(45) Date of Patent: Dec. 2, 2025

(54) APPARATUS FOR WINDING AND PULLING A ROPE LINE AT CONSTANT SPEED

(71) Applicant: White's Welding, LLC, Woodward, OK (US)

(72) Inventors: Robert John Princess, Woodward, OK (US); Russell Thompson, Woodward, OK (US)

(73) Assignee: White's Welding, LLC, Woodward, OK (US)

( * ) Notice: Subject to any disclaimer, the term of this patent is extended or adjusted under 35 U.S.C. 154(b) by 372 days.

(21) Appl. No.: 18/099,162

(22) Filed: Jan. 19, 2023

(65) Prior Publication Data

US 2023/0227293 A1 Jul. 20, 2023

Related U.S. Application Data

(60) Provisional application No. 63/301,262, filed on Jan. 20, 2022.

(51) Int. Cl.
*B66D 1/38* (2006.01)
*B66D 1/48* (2006.01)
*B66D 1/20* (2006.01)

(52) U.S. Cl.
CPC ............... *B66D 1/38* (2013.01); *B66D 1/485* (2013.01); *B66D 1/20* (2013.01)

(58) Field of Classification Search
CPC ....... B66D 1/20; B66D 1/38; B66D 1/48–525
See application file for complete search history.

(56) References Cited

U.S. PATENT DOCUMENTS

| | | | | |
|---|---|---|---|---|
| 3,811,656 A * | 5/1974 | Hoover | B66D 1/20 254/311 |
| 7,063,306 B2 * | 6/2006 | Sanders | B66D 1/54 254/377 |
| 2016/0096709 A1 * | 4/2016 | Averill | B66D 1/12 318/6 |
| 2016/0115754 A1 * | 4/2016 | Yang | B66D 1/38 166/53 |
| 2017/0320712 A1 * | 11/2017 | Shook | B66D 1/38 |
| 2018/0201489 A1 * | 7/2018 | Schmidt | B66D 1/7415 |
| 2021/0130144 A1 * | 5/2021 | Haley | B66D 1/38 |

(Continued)

FOREIGN PATENT DOCUMENTS

JP H08301580 A * 11/1996 ............... B66D 1/38

*Primary Examiner* — Anna M Momper
*Assistant Examiner* — Nathaniel L Adams
(74) *Attorney, Agent, or Firm* — Hall Estill Law Firm

(57) ABSTRACT

A rope pulling apparatus including a drum for having rope wound therearound and a drive apparatus for providing power to the rope pulling apparatus and driving the drum's rotations. The rope pulling apparatus also includes a speed control apparatus monitoring the rope being pulled and wound on the drum and a controller for determining the speed of the rope and adjusting the drive apparatus to speed up or slow down the rotation of the drum responsive to the speed of the rope. A method of winding rope on a drum at a constant rope speed. The method includes winding a rope at a desired constant rope speed onto a drum with a rope pulling apparatus and determining a speed of the rope. The method also includes adjusting power of the rope pulling apparatus to achieve the desired constant speed.

13 Claims, 5 Drawing Sheets

(56) References Cited

U.S. PATENT DOCUMENTS

| | | | | |
|---|---|---|---|---|
| 2023/0101055 | A1* | 3/2023 | Caldwell ................ | B66D 1/485 254/276 |
| 2024/0025696 | A1* | 1/2024 | Princess ............ | B65H 54/2812 |

* cited by examiner

APPARATUS FOR WINDING AND PULLING A ROPE LINE AT CONSTANT SPEED

STATEMENT REGARDING FEDERALLY SPONSORED RESEARCH OR DEVELOPMENT

Not applicable.

CROSS-REFERENCE TO RELATED APPLICATIONS

The present application is a conversion of U.S. Provisional Application having U.S. Ser. No. 63/301,262, filed Jan. 20, 2022, which claims the benefit under 35 U.S.C. 119 (e). The disclosure of which is hereby expressly incorporated herein by reference.

BACKGROUND OF THE DISCLOSURE

1. Field of the Invention

The present disclosure relates to a rope pulling apparatus for winding and pulling a rope line at a constant speed.

2. Description of the Related Art

Drum pullers are used to wind rope used to pull electric lines to desired locations. For safety reasons, the electric lines can only be pulled at a certain maximum speed, thus the rope can only be pulled at the certain maximum speed. Typically, the drums the rope is wound around are turned at a constant speed such that when the rope is at the outer edges of the winding, the speed of the rope and electric line do not exceed the maximum allowed speed. The problem that occurs with the drum running at constant speed is when there is very little rope on the drum, the rope speed is very slow because not much rope length is wound per revolution of the drum.

Accordingly, there is a need for an apparatus that can pull and wind the rope at a constant speed of the rope.

SUMMARY OF THE DISCLOSURE

The present disclosure is directed toward a rope pulling apparatus including a drum for having rope wound therearound and a drive apparatus for providing power to the rope pulling apparatus and driving the drum's rotations. The rope pulling apparatus also includes a speed control apparatus monitoring the rope being pulled and wound on the drum and a controller for determining the speed of the rope and adjusting the drive apparatus to speed up or slow down the rotation of the drum responsive to the speed of the rope.

The present disclosure is also directed toward a method of winding rope on a drum at a constant rope speed. The method includes winding a rope at a desired constant rope speed onto a drum with a rope pulling apparatus and determining a speed of the rope. The method also includes adjusting power of the rope pulling apparatus to achieve the desired constant speed.

DETAILED DESCRIPTION OF THE DISCLOSURE

Figure 1:
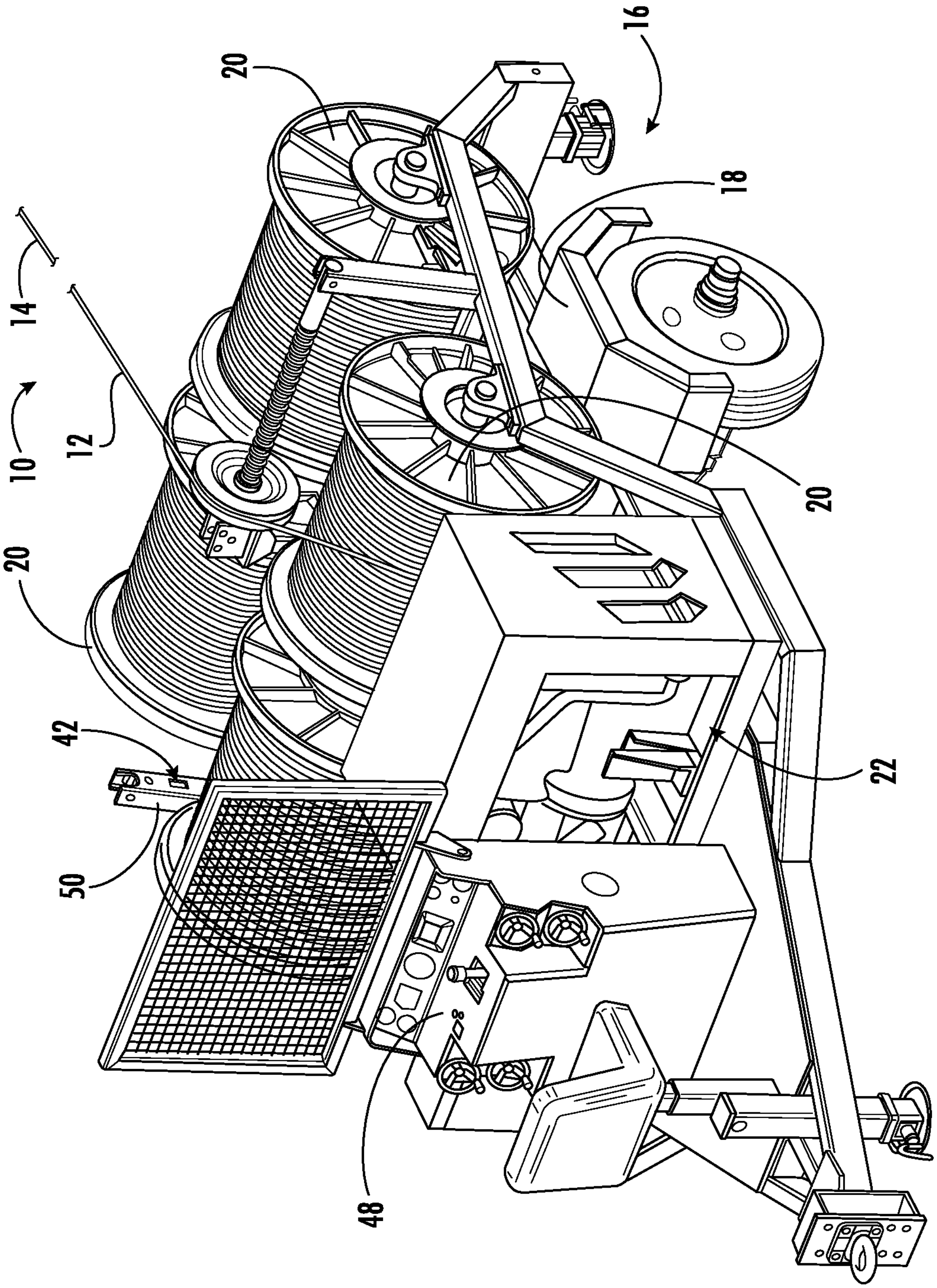
FIG. 1 is a perspective view of rope pulling apparatus constructed in accordance with the present disclosure.
Figure 2:
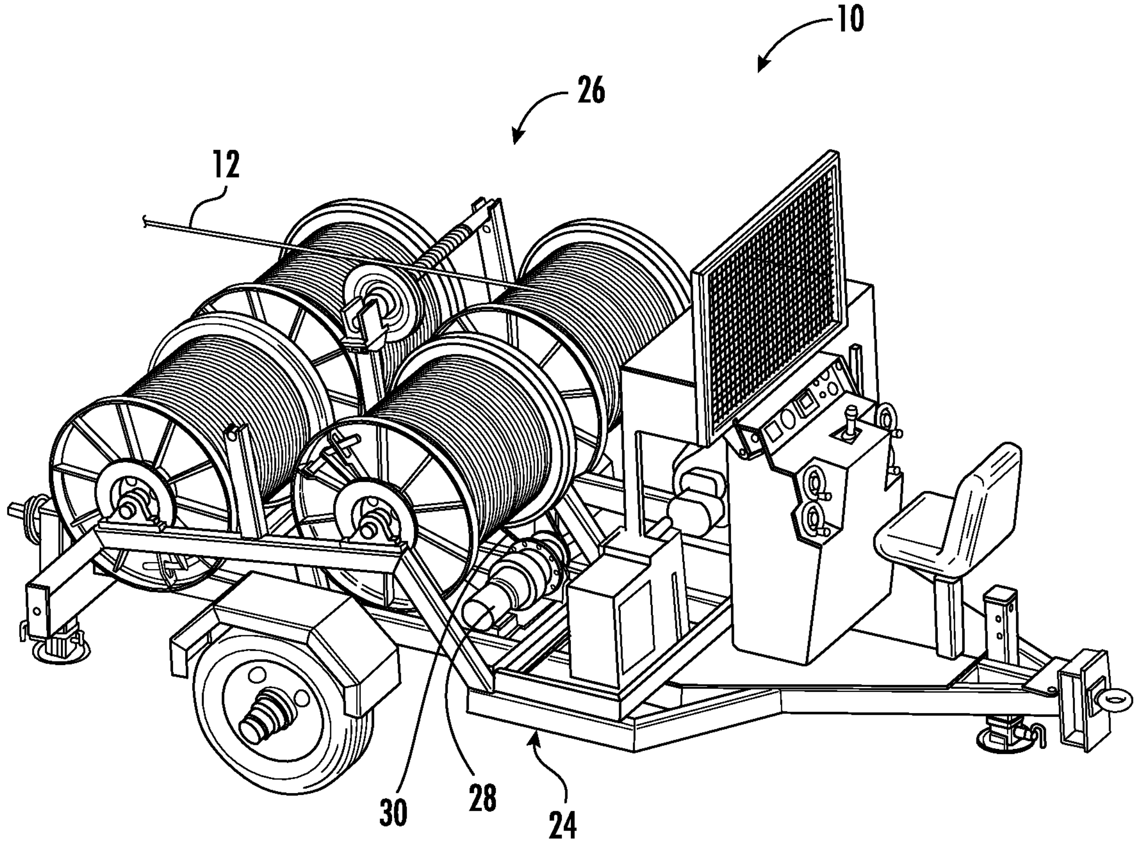
FIG. 2 is another perspective view of the rope pulling apparatus constructed in accordance with the present disclosure.
Figure 3:
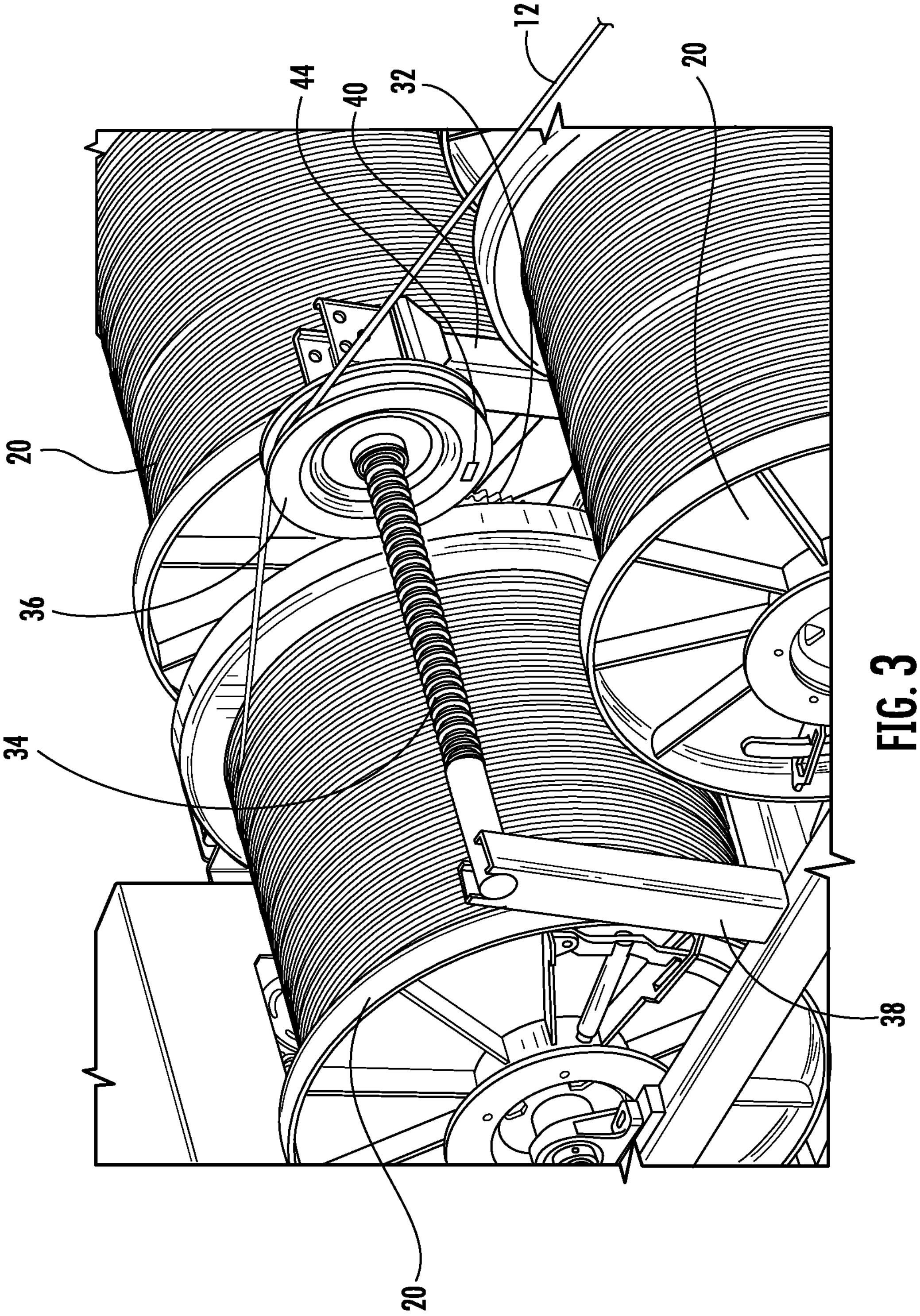
FIG. 3 is a perspective view of a part of the rope pulling apparatus constructed in accordance with the present disclosure.
Figure 4:
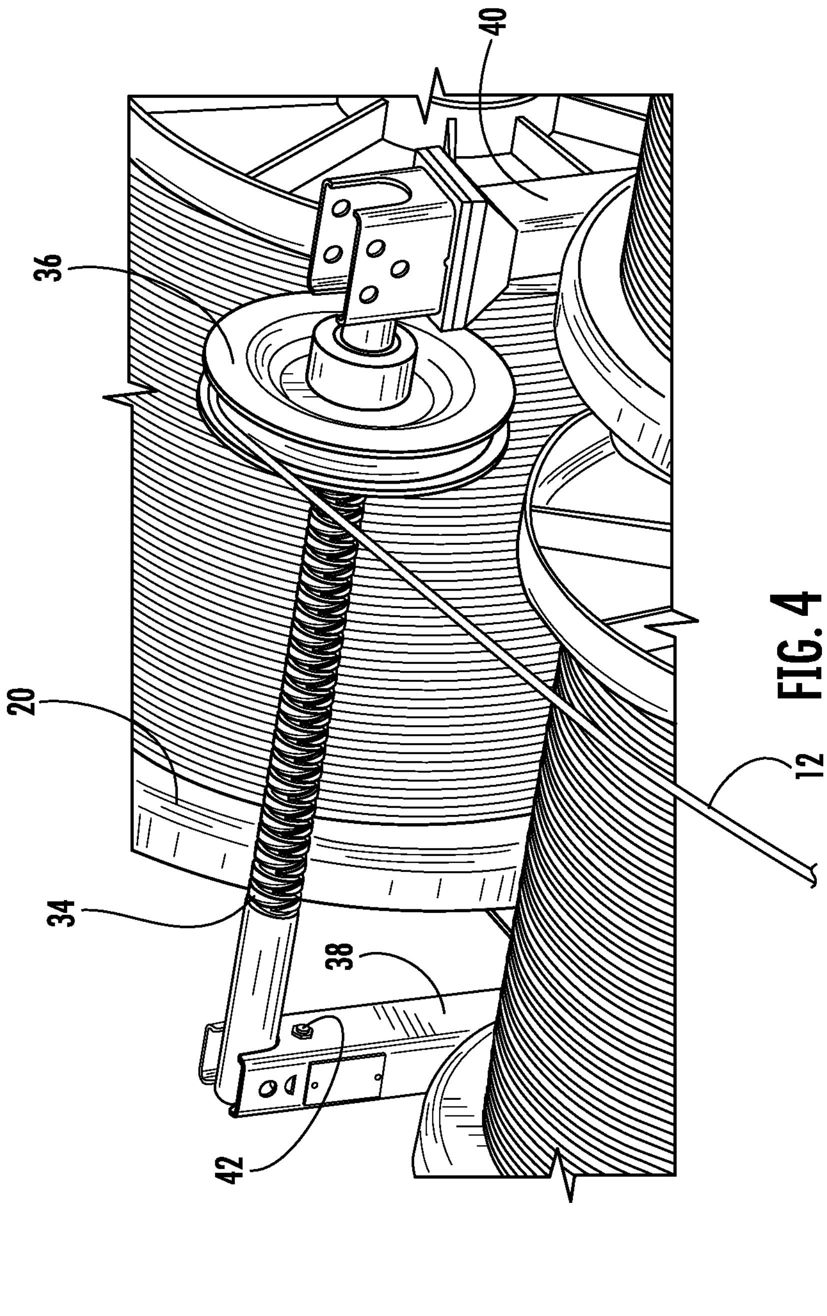
FIG. 4 is a perspective view of another portion of the rope pulling apparatus constructed in accordance with the present disclosure.
Figure 5:
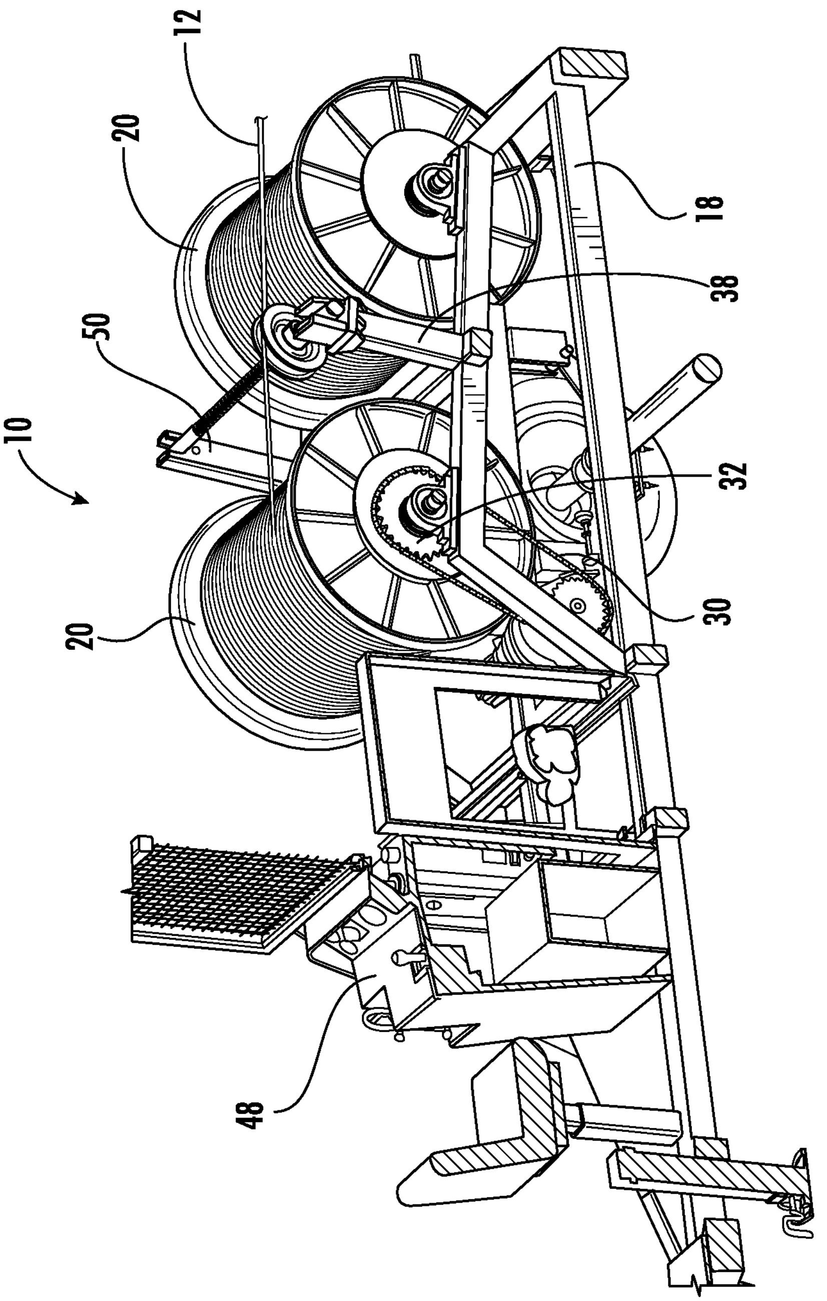
FIG. 5 is a perspective view of another portion of the rope pulling apparatus constructed in accordance with the present disclosure.

The present disclosure is related to a rope pulling apparatus 10 for pulling and winding a rope 12 used to pull an electric line 14 in a desired place. The rope pulling apparatus 10 can be mounted to a transportation apparatus 16, such as a trailer or vehicle 18. The rope pulling apparatus 10 can include a drum 20 to be rotated have the rope 12 rotated thereon, an engine 22 for supplying power to the rope pulling apparatus 10, a drive apparatus 24 for transferring power from the engine 22 to the drum 20, and a speed control apparatus 26 to monitor the speed of the rope 12 being wound on the drum 20. The rope pulling apparatus 10 can include multiple drums 20 for winding multiple separate ropes 12.

The drive apparatus 24 can include any devices needed to transfer the power from the engine 22 to the drum 20. The drive apparatus 24 can include a motor 28 that turns a chain 30. The drive apparatus 24 can also include a gear 32 or sprocket 32 attached to the drum 20 that can be turned by the chain 30 being moved by the motor 28. In the situation where the rope pulling apparatus 10 has multiple drums 20, each drum 20 could have a separate gear/sprocket 32 that is connected by the same chain 30. Each drum 20 could have a clutch (not shown) that would permit a user the ability to activate the desired drum 20. Any other configuration could be established where only one drum 20 is turned at a time by the driving apparatus 24 and the engine 22.

The speed control apparatus 26 can include a self-reversing screw 34 with a sheave 36 that turns around the self-reversing screw 34. The rope 12 that is wound on the drum 20 travels across the sheave 36 and turns the sheave 36 as the rope 12 is wound. As the sheave 36 turns it travels back and forth on the self-reversing screw 34, which permits the rope 12 to be evenly wound on the drum 20. The self-reversing screw 34 can be pivotably attached on one end to a support post 38. In another embodiment, the self-reversing screw 34 can just be secured to the first support post 38. The self-reversing screw 34 can be selectively supported on the other end by a second support post 40. The speed the rope 12 is pulled is relative to the rate at which the sheave 36 rotates and the size of the sheave 36. The second support post 40 can have a sensor 42 disposed therein that works with a sensing element 44 (such as a reflector) disposed on the side 46 of the sheave 36 that is in line with the first sensor 42. When the sheave 36 turns, the sensing element 44 is detected by the first sensor 42. Each detection of the sensing element 44 corresponds to a full turn of the sheave 36, which corresponds to a certain length of rope. The rate the detections occur and the length of rope associated with each turn of the sheave 36 provides a speed of the rope 12. One example of a sensor 42 that can be used for this application is a retro-reflective sensor. It should be understood and appreciated that the sensor 42 can be disposed in any support post such that it is in line of sight with the sensing element 44 disposed on the sheave 36. The sheave 36 could have a sensing element 44 disposed on both sides so that multiple sensors located at various spots could be used to determine the rotational speed of the sheave 36.

The information from the sensor can be sent to a controller 48 of the rope pulling apparatus 10 where a speed of the rope 12 can be generated. A target speed of the rope 12 can be input into the controller 48. The controller 48 can continuously monitor the speed of the rope 12 and can increase or decrease the power of the engine 22 to cause the drum 20 to turn at a rate that corresponds to the desired speed of the rope 12. This functionality permits the rope pulling apparatus 10 to achieve a continuous rate of speed of the rope 12 being wound on the drum 20. The controller 48 can also set a range of speeds that the rope pulling apparatus 10 could operate in. For example, the controller 48 could be given low end speed that the rope pulling apparatus should not let the rope speed fall under, and it could be given an upper limit speed that the rope pulling apparatus 10 should not let the rope speed go above the upper limit speed. The controller 48 can manipulate the function of hydraulic fluid flow rate, hydraulic system pressure, engine horsepower, and rpm of the drum 20 based on the speed of the self-reversing screw 34 and sheave 36 that guides the rope 12 onto the drum 20, to maintain as close to max rated line speed as possible.

Under certain conditions, the tension on the rope 12 will spike. In this situation, the engine 22 can include a hydraulic pump swash plate that can be adjusted by the controller 48 to guard against an over horsepower event. This horsepower limiting function will keep the engine parameters within the max operating output, which will prevent any premature failures.

When multiple drums 20 are used by the rope pulling apparatus 10, the self-reversing screw 34 and sheave 36 disposed thereon can have a first position relative to a first drum 20*a*, a second position with respect to a second drum 20*b*, etc. The self-reversing screw 34 can be pivoted/rotated with respect to the first support post 38 and have the second end of the self-reversing screw 34 be supported by a third support post 50. When the self-reversing screw 34 is supported by the first support post 38 and the third support post 50, the self-reversing screw 34 would be positioned such that the sheave 36 would guide the rope 12 across the second drum 20*b*.

The second and third support posts 38 and 50 can include any mechanical means known in the art for securing the second end of the self-reversing screw 34 thereto. The first, second and third support posts 38, 40 and 50 can be supported by the trailer or vehicle in any manner known in the art.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A rope pulling apparatus, the apparatus comprising:

a drum for having rope wound therearound;

a drive apparatus for providing power to the rope pulling apparatus and driving the drum's rotations;

a speed control apparatus monitoring the rope being pulled and wound on the drum, the speed control apparatus including a self-reversing screw and a sheave rotatably disposed around the self-reversing screw, the sheave guides the rope and rotates as the rope is wound on the drum;

a first support post supporting a first end of the self-reversing screw and a second support post supporting a second end of the self-reversing screw that positions the self-reversing screw relative to the drum so that the rope can be evenly wound on the drum as the drum turns and the rope is wound thereon;

a controller for determining the speed of the rope and adjusting the drive apparatus to speed up or slow down the rotation of the drum responsive to the speed of the rope; and wherein the first end of the self-reversing screw is hingedly attached to the first support post so the self-reversing screw can be pivoted such that the second end of the self-reversing screw can be supported by a third support post so that the self-reversing screw can be properly positioned relative to a second drum so that the rope can be evenly wound on the second drum as the second drum turns and the rope is wound thereon.

2. The apparatus of claim 1 wherein the drive apparatus includes a motor, a chain and a sprocket that is rotationally attached to the drum, the motor transferring power from an engine to the drum via the chain and sprocket.

3. The apparatus of claim 2 wherein the rope pulling apparatus includes multiple drums for having rope wound therearound, each drum can be rotationally attached to a separate sprocket.

4. The apparatus of claim 1 wherein the speed control apparatus includes a sensor to determine the number of revolutions of the sheave per unit of time and providing that information to the controller.

5. The apparatus of claim 4 wherein the sheave includes a sensing element disposed thereon that cooperates with the sensor to determine the number of revolutions of the sheave per unit of time.

6. The apparatus of claim 1 wherein the controller is set where the rope speed does not go above a certain speed and the rope does not fall below a certain speed.

7. The apparatus of claim 1 wherein the rope pulling apparatus is disposed on a trailer or vehicle.

8. A method of winding rope on a drum at a constant rope speed, the method comprising:

winding a rope at a desired constant rope speed onto a drum with a rope pulling apparatus, the rope pulling apparatus comprising:

a drive apparatus for providing power to the rope pulling apparatus and driving the drum's rotations;

a speed control apparatus monitoring the rope being pulled and wound on the drum, the speed control apparatus including a self-reversing screw and a sheave rotatably disposed around the self-reversing screw, the sheave guides the rope and rotates as the rope is wound on the drum;

a first support post supporting a first end of the self-reversing screw and a second support post supporting a second end of the self-reversing screw that positions the self-reversing screw relative to the drum so that the rope can be evenly wound on the drum as the drum turns and the rope is wound thereon;

a controller for determining the speed of the rope and adjusting the drive apparatus to speed up or slow down the rotation of the drum responsive to the speed of the rope; and wherein the first end of the self-reversing screw is hingedly attached to the first support post so the self-reversing screw can be pivoted such that the second end of the self-reversing screw can be supported by a third support post so that the self-reversing screw can be properly positioned relative to a second drum so that the rope can be evenly wound on the second drum as the second drum turns and the rope is wound thereon;

determining a speed of the rope; and adjusting power of the rope pulling apparatus to achieve the desired constant speed.

9. The method of claim 8 wherein the drive apparatus includes a motor, a chain and a sprocket that is rotationally attached to the drum, the motor transferring power from an engine to the drum via the chain and sprocket.

10. The method of claim 9 wherein the rope pulling apparatus includes multiple drums for having rope wound therearound, each drum can be rotationally attached to a separate sprocket.

11. The method of claim 8 wherein the speed control apparatus includes a sensor to determine the number of revolutions of the sheave per unit of time and providing that information to the controller.

12. The method of claim 11 wherein the sheave includes a sensing element disposed thereon that cooperates with the sensor to determine the number of revolutions of the sheave per unit of time.

13. The method of claim 8 wherein the controller is set where the rope speed does not go above a certain speed and the rope does not fall below a certain speed.

* * * * *